(12) United States Patent
Pai et al.

(10) Patent No.: US 7,733,035 B2
(45) Date of Patent: Jun. 8, 2010

(54) ELECTRONIC POWER SUPPLY DEVICE FOR LIGHT-EMITTING DIODE

(76) Inventors: Hao-Chin Pai, 6F., No. 3, Lane 68, San Min Rd., Sung Shan District, Taipei City (TW); Li-Teh Chen, 1F., No. 10, Alley 5, Lane 61, Pu Hsin St., Shen Keng Hsiang, Taipei Hsien (TW); Siang-Hsiung Chen, 3F-5, No. 547, Kuang Fu S. Rd., Taipei City (TW); Min-Yung Hsu, 3F-5, No. 547, Kuang Fu S. Rd., Taipei City (TW)

( * ) Notice: Subject to any disclaimer, the term of this patent is extended or adjusted under 35 U.S.C. 154(b) by 282 days.

(21) Appl. No.: 12/024,124

(22) Filed: Feb. 1, 2008

(65) Prior Publication Data

US 2009/0195170 A1 Aug. 6, 2009

(51) Int. Cl.
*H05B 37/02* (2006.01)
(52) U.S. Cl. .................. 315/307; 315/149; 315/308
(58) Field of Classification Search ................. 315/291, 315/307, 308, 309, 149, 156, 157, 158, 159; 323/225, 223; 362/219, 227, 231
See application file for complete search history.

(56) References Cited

U.S. PATENT DOCUMENTS

| 6,659,622 | B2 * | 12/2003 | Katogi et al. | 362/219 |
| 7,224,150 | B2 * | 5/2007 | Iwabuki et al. | 323/225 |
| 2004/0004446 | A1 * | 1/2004 | Liu | 315/224 |

\* cited by examiner

*Primary Examiner*—David Hung Vu
(74) *Attorney, Agent, or Firm*—Leong C. Lei (57) ABSTRACT

An electronic power supply device is provided for light-emitting diodes (LEDs), which employs electronic control to maintain the LEDs within the rated ranges of current, voltage and temperature and provides the LEDs with extremely stable current, voltage and temperature. Meanwhile, the power supply device is effective in confining the LEDs within the rated ranges of voltage, current, and temperature so that the excellent electronics protection and design of logic device realized by the power supply device effectively overcomes aging/deterioration of LEDs caused by exceeding voltage and current and burning out due to exceeding temperature and also effectively pushes the rated current and voltage of a (low-power) LED module toward the maximum values to provide the greatest luminous efficiency for upgrading the applications of the LEDs to the primary grade of lighting.

5 Claims, 6 Drawing Sheets

PRIOR ART

FIG. 1

PRIOR ART

FIG. 2

PRIOR ART

ELECTRONIC POWER SUPPLY DEVICE FOR LIGHT-EMITTING DIODE

BACKGROUND OF THE INVENTION (a) Technical Field of the Invention

The present invention relates to an electronic power supply device for light-emitting diodes (LEDs), which is aimed to provide an electronic power supply device for LEDs to make a breakthrough for the limitations imposed to the currently available (low-power) LEDs due to restriction and stability in voltage, current and temperature in order to make the application and lighting efficiency of the (low-power) LEDs well satisfying the general requirements for regular lighting purposes; thus the present invention is provided to enhance the lighting efficiency of the low-power LEDs by offering features of control, detection, protection, and brightness adjustment and maintaining stable effect of current, voltage and temperature within the rated ranges of voltage, current, and temperature to thereby improve the performance utilization efficiency of the whole LED module and make the low-power LEDs fully exploiting the maximum performance utilization efficiency and brightness efficiency so as to effectively overcome the operation problems of high-power LEDs caused by exceeding high temperature and also to provide the low-power LEDs with new fields of application by upgrading the low-power LEDs to the primary grade of lighting application. Accordingly, the present invention provides an electronic power supply device for LEDs, which is applicable to both high-power LEDs and low-power LEDs for enhancement of brightness efficiency, performance utilization efficiency, and temperature controllability.

For high-power LEDs, their specifications are usually set on the basis of wattages, such as 1 W, 3 W and 5 W. Thus, the rated voltage and current of the high-power LEDs are high and the brightness that can be given off is correspondingly heightened. For the current technology, if heat dissipation is temporarily not taken into consideration, projects of using the high-power LEDs in primary lighting device are available. Such projects are the important concerns for the manufacturers in the related fields.

In view of the characteristics of the high-power LEDs, since they have high rated voltage and current, high radiation of thermal energy occurs. For the current development of high-power LEDs, the problem heat dissipation is always troubling the manufacturers and no feasible solution for optimum and efficient dissipation of heat is available. Thus, power consumption and thermal issue are major factors for the success of the high-power LEDs. However, these two are of a vicious circle relationship and are the factor for the failure of the high-power LEDs.

For the applications of the high-power LEDs, the most important issue is the dissipation of heat generated thereby. If the heat cannot be properly dissipated, once the temperature gets beyond the rated range of temperature, the LEDs may get burnt out or aging thereof is accelerated. This is true for both low-power and high-power LEDs. Once aging occurs, the brightness of the LEDs get seriously deteriorated, which is thus irreversibly damaged. Thus, the heat dissipation issue is the most important challenge for the manufacturers and engineers, and various proposals have been made. Such proposed thermal solutions for high-power LEDs are of two categories, the active heat dissipation mechanism and the passive heat dissipation mechanism. Other types of heat dissipation, such as liquid heat dissipation device disclosed in UP patent documents, which is applicable to bulb-shaped LED structure, is also available.

For low-power LEDs, since the rated voltage and current are low, their power consumption and heat generated are small. Currently, the low-power LEDs are mature market products, but they are still of poor brightness efficiency and the applications thereof are dependent upon the factors including constituent number of the LEDs, the voltage, the current, and the heat dissipation gap. Thus, they are not still applicable in the field of lighting.

Although the present invention is applicable to the range of high-power LEDs for realizing control, detection, protection, brightness adjustment and for being well maintained in the rated ranges of voltage, current and temperature, to provide extremely stable current, voltage and thermal effect and thus enhancing the performance utilization efficiency and maximum brightness efficiency of the whole LED module, yet incorporation with a heat dissipation mechanism for accelerating heat dissipation is preferred. For low-power LEDs, a novel and revolutionary application can be realized. First, according to the characteristics of the low-power LEDs, since the rated voltage and current are low, the power consumption and temperature are low and thus, the issues of power saving and low thermal efficiency can be alleviated and overcome. Thus, the present invention is made on the basis of the following aspects.

The first aspect of the present invention is to provide a power supply system of extremely stable voltage and current within the rated ranges of voltage and current of the LEDs (including both high-power and low-power LEDs) so that an LED module can have extremely stabilized lighting efficiency for effectively controlling the thermal issue induced.

The second aspect of the present invention is to up-push the voltage and current of LEDs within the rated voltage and current and temperature of the LEDs (including both high-power and low-power LEDs) and under the condition of ensuring stable power supply, so that the brightness efficiency and the temperature of the LEDs can be of optimum (maximum) level of matching within the normal operation values and temperature.

The third aspect of the present invention is to employ a photo-coupling circuit for detection the supplied current and voltage and the energy conversion efficiency within the rated voltage and current and temperature of the LEDs (including both high-power and low-power LEDs) and under the condition of ensuring stable power supply and enhanced brightness efficiency, so that any minor variation can be effectively changed and handled to provide intelligent functional modulation capability to further realize protection of LED modules and the power supply, leading to extension of service life of both.

The fourth aspect of the present invention is to monitor the temperature of working environment (which means extremely bad and extremely hot working environment here) within the rated voltage and current and temperature of the LEDs (including both high-power and low-power LEDs) and under the condition of ensuring stable power supply and enhanced brightness efficiency, in order to first use an effective and stable process to reduce the current and voltage for protecting the power supply device and maintaining the normal operation of the LED module and then, after the power supply dropping the voltage and current to resume the normal operation temperature, use an effective and stable process to increase the current and voltage, so that a humanized control mechanism can be realized (such changes taking place in a naked-eye invisible fashion) for protecting the LED module and extending service life thereof.

The fifth aspect of the present invention is to monitor the temperature of working environment (which means extremely bad and extremely cold working environment here) within the rated voltage and current and temperature of the LEDs (including both high-power and low-power LEDs) and under the condition of ensuring stable power supply and enhanced brightness efficiency, in order to activate a system heating module for pre-heating the circuit device to realize protection of the LED module and extending service life thereof.

The sixth aspect of the present invention is to combine an LED brightness adjustment module to the load end, within the rated voltage and current and temperature of the LEDs (including both high-power and low-power LEDs) and under the condition of ensuring stable power supply and enhanced brightness efficiency, in order to realize stepless adjustment of brightness.

Based on the above description, the present invention provides an electronic power supply device for LEDs, which facilitates the applications of LED modules to various lighting and indication for enhancing the operation and model of LED module and this is particularly a novel way of application for low-power LEDs. Meanwhile, the present invention allows significant enhancement of brightness and efficiency of LEDs within the rated ranges of voltage, current and temperature and under the condition for realizing control, detection, protection, brightness adjustment and providing stable current and voltage and temperature effect, to thereby significantly improve brightness efficiency of LED module and effectively control and protect the power supply device and the LED module for eventually achieving the goals of power saving and extended service life.

(b) Description of the Prior Art

In the field of lighting, household lighting devices have evolved from the early stage of incandescent bulbs of high wattage to lamp tubes (fluorescent tubes) and further evolved to the energy-saving lamp tubes, such as PL tubes, energy-saving bulbs (with stabilizer). This change to the household lighting device was simply happening in a short periods of tens of years and a significant progress and innovation occurs for the lighting devices.

Recently, the era of environment conservation and development of substitute energy arrives; and the energy-saving lighting devices, which are most commonly used recently, namely the fluorescent tube, the PL tubes, and the energy-saving bulbs, are subjected to challenge for saving of power for the amount of energy consumed by these lighting devices is dependent upon the quantity thereof. A great quantity of the lighting devices certainly causes a great amount of energy consumed. Taking the fluorescent tube as an example, the power consumption for use of four 20 W fluorescent tubes can be calculated as 20 W×4=80 W. This way of calculation is also applicable to PL tubes and bulbs. Further, in the case of PL tubes and power-saving bulbs with stabilizer, the power consumption is less than the traditional lighting bulbs, but a by-product of "high temperature" is caused, which leads to additional load and/or requirement of installation of air-conditioning systems. An additional safety problem also rises for all the lighting bulbs or tubes are made of glass, which is of a potential risk of explosion and they are considered highly dangerous objects in installation, waste handling, recycling and transportation.

In view of the above problems, low-power light-emitting diodes (LEDs) provide a feasible solution and are becoming a prosperous and promising substitute for the traditional lighting devices. According to reports and articles describing the low-power LEDs as a substitute for the traditional lighting, due to the advantages of having high brightness, capability of long distance projection, high condensability, and low power consumption, the low-power LEDs are quite a solution for lighting that meets the general needs of human society and environmental conservation. The most important is the extreme saving of power that the LEDs can achieve and the availability of material and low costs for making the LEDs, which give the LEDs the most important advantages of reduced cost. Thus, the LEDs is of the most promising commercial application in the filed of lighting.

Figure 1:
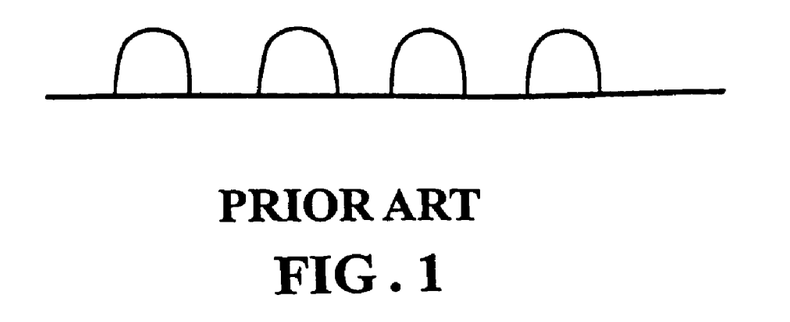
FIG. 1 is a schematic view of half wave after rectification by a conventional power supply device.
Figure 2:
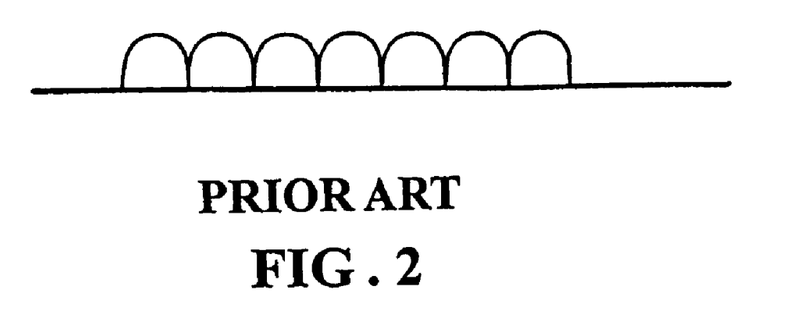
FIG. 2 is a schematic view of full wave after rectification by the conventional power supply device.
Figure 3:
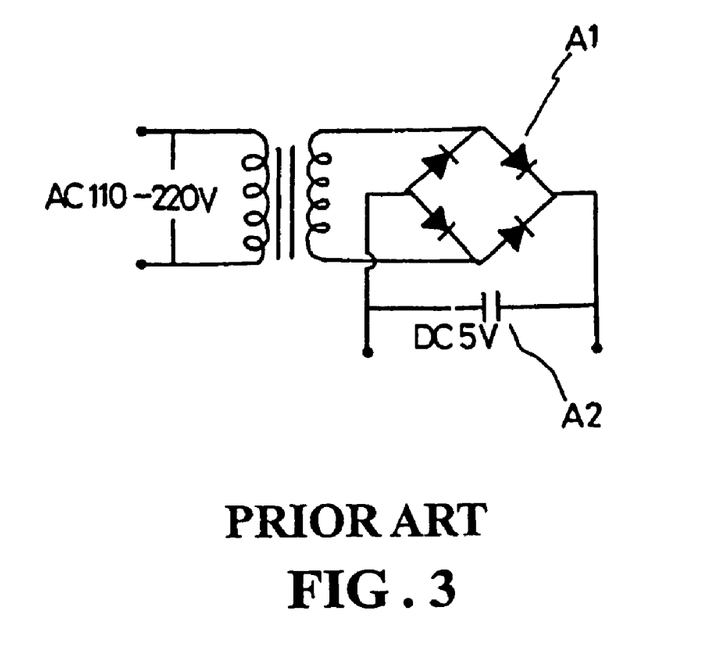
FIG. 3 is a circuit diagram of rectification and filter circuit of a conventional power supply device.

The LEDs are operated with direct current (DC) power. Thus, for the operation of the LEDs, if battery or cell based DC power supply is excluded and alternate current (AC) power mode is taken into consideration, the operation of LEDs would require conversion of the AC into DC power before the power can be supplied to the LEDs. This is the general way and construction that the application of the LEDs is taken. For example, as shown in FIGS. 1-3 of the attached drawings, conventionally, a power supply device is employed to realize power supply to the LEDs, and the known power supply device generally comprises a bridge rectifier A1, which converts 110V-220V AC into DC of 12V or 9V or 3V. Then, a capacitor A2 converts the waveform into DC pulses of positive cycles of Sine wave to thereby complete the conversion.

However, in respect of the high-power LEDs, since the output voltage and current (around 3 A) are still of high levels, for a large-sized high-power LED module, a bulky power supply device is needed to supply power of regulated voltage and stable current. On the other hand, for the LED module at a load end, since the output voltage and current are of high levels, remarkable variation of instantaneous voltage, current, resistance and temperature may occur, making the load end very unstable. Further, since the LED module is usually of a large scale and compact design, high temperature often result. For design of poor heat dissipation, high temperature would result again and the high temperature itself leads to instability of instantaneous voltage and current, which once again result influence of the LED module of the load end.

Once the voltage and current of the supplied power or the temperature caused thereby exceed the rated values specified to the LEDs, aging of the LEDs, such as deterioration of lighting performance and reduction of brightness, may occur, or even worse, the LEDs may get burnt out. Thus, application of the high-power LEDs in the field of lighting will inevitably encounter the problems associated with current, voltage and temperature. Consequently, the stability and service of lighting device using the high-power LEDs are still doubtful.

For low-power LEDs, since the output voltage and current are small, the temperature caused is low, but the lighting performance is apparently insufficient. Thus, conventionally, the operation mode of the low-power LEDs is simply making straightforward and simple conversion by using diodes before the power is employed to drive the low-power LEDs. Further, to ensure the low-power LEDs well within the rated ranges of current, voltage, and temperature, the lighting efficiency and performance of the low-power LEDs are kept low.

If the number of LEDs at the load end is significantly increased and the lighting efficiency of the low-power LEDs is enhanced and the LED module of the load end adopts a large-scale and compact design, then the required output voltage and current will be increased, and the temperature is also increased. Thus, the same old problems of the high-power LED rise again. Thus, the three factors of current, voltage, and temperature caused are the primaries that are considered in the present invention.

SUMMARY OF THE INVENTION

The primary purpose of the present invention is to provide an electronic power supply device for LEDs, which is to provide an LED with extremely stable current and voltage and temperature within the rated ranges of current, voltage and temperature. Further, the present invention is to allow an LED to use the excellent circuit of the present invention to realize control, detection, protection and brightness adjustment within the rated ranges of voltage, current, and temperature for further enhancing the performance utilization efficiency of the LED modules and making the lighting efficiency of the LED maximized.

The electronic power supply device in accordance with the present invention comprises a rectifier, an energy conversion system, a feedback circuit, a photo-coupling circuit, a system heat detection circuit, a heat balance circuit, a system heating module, and a load end including an LED module and an LED brightness adjustment module, wherein the rectifier uses a bridge rectification circuit to rectify 110V-220V power and uses a filter to filter the power, which is then applied to the energy conversion system that employs a field effect transistor (power transistor) to play the role of control circuit by retrieving a portion of an output voltage to the photo-coupling circuit to carry out error amplification and providing a reference voltage as a reference for regulation of voltage and the error being then amplified and based on the reference voltage and using the voltage variation of a voltage divider for amplification for the energy conversion system to ensure stable voltage output and thus achieving voltage adjustment and automatic voltage regulation.

Further, the LED module of the load end uses the photo-coupling circuit to carry out detection. Once variation occurs in the load end or abnormal variation occurs, detection is effected and a signal is transmitted to the feedback circuit. The feedback circuit then carries out frequency adjustment for controlling and outputting better result of voltage adjustment to thereby achieve excellent dynamic regulation and output of voltage.

In the electronic power supply device of the present invention, to take into consideration thermal issue that causes reduction of power supply efficiency and conversion, the system heat diction circuit is used to carry out detection and protection of which the operation is detection of temperature and uses preset reference basic value for detection. If the detected temperature is too high, then it is provided to the photo-coupling circuit and the feedback circuit to gradually reduce the efficiency conversion of the energy conversion system. After the temperature is lowered to be within the reference value, the reference is modified for repeated detection and control and thus setting the whole device in the optimum operation within normal working temperature environment and intelligent detection, protection and adjustment mechanism is realized for extending the service life of the power supply device and the LED module in the load end.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 5:
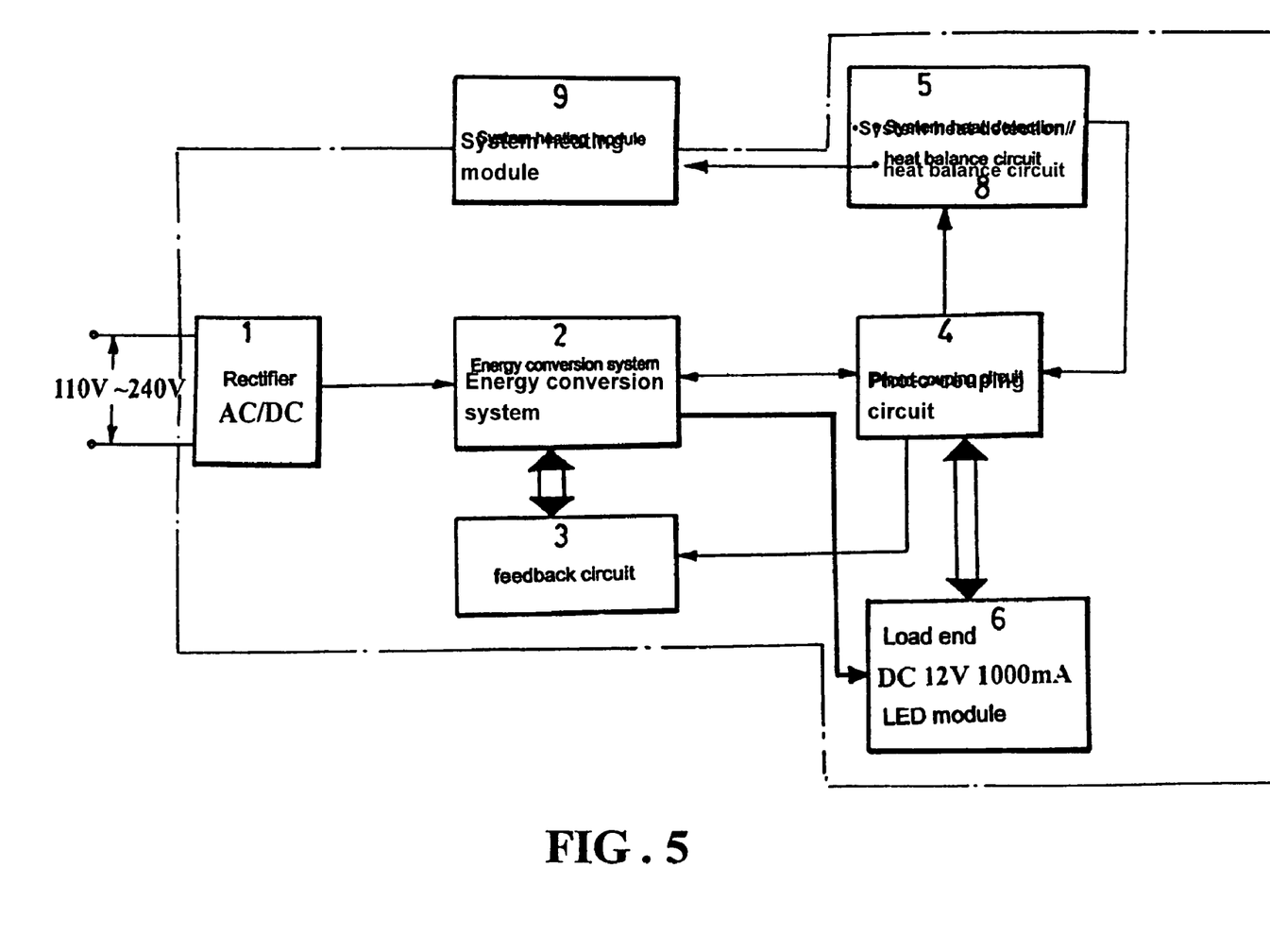
FIG. 5 is a circuit block diagram of a second embodiment of a power supply device in accordance with the present invention.

With reference to the drawings and in particular to FIG. 5, which shows an electronic power supply device constructed in accordance with the present invention for supplying electrical power to a light-emitting diode (LED) module, which is generally designated with reference numeral 6 in the drawings, the electronic power supply device in accordance with the present invention comprises a rectifier 1, an energy conversion system 2, a feedback circuit 3, a photo-coupling circuit 4, and a system heat detection circuit 5, to which a load 6 represented by the LED module 6 is coupled, to realize supply of stable regulated DC power, adjustment regulation of voltage, and detection and control of heat.

Figure 9:
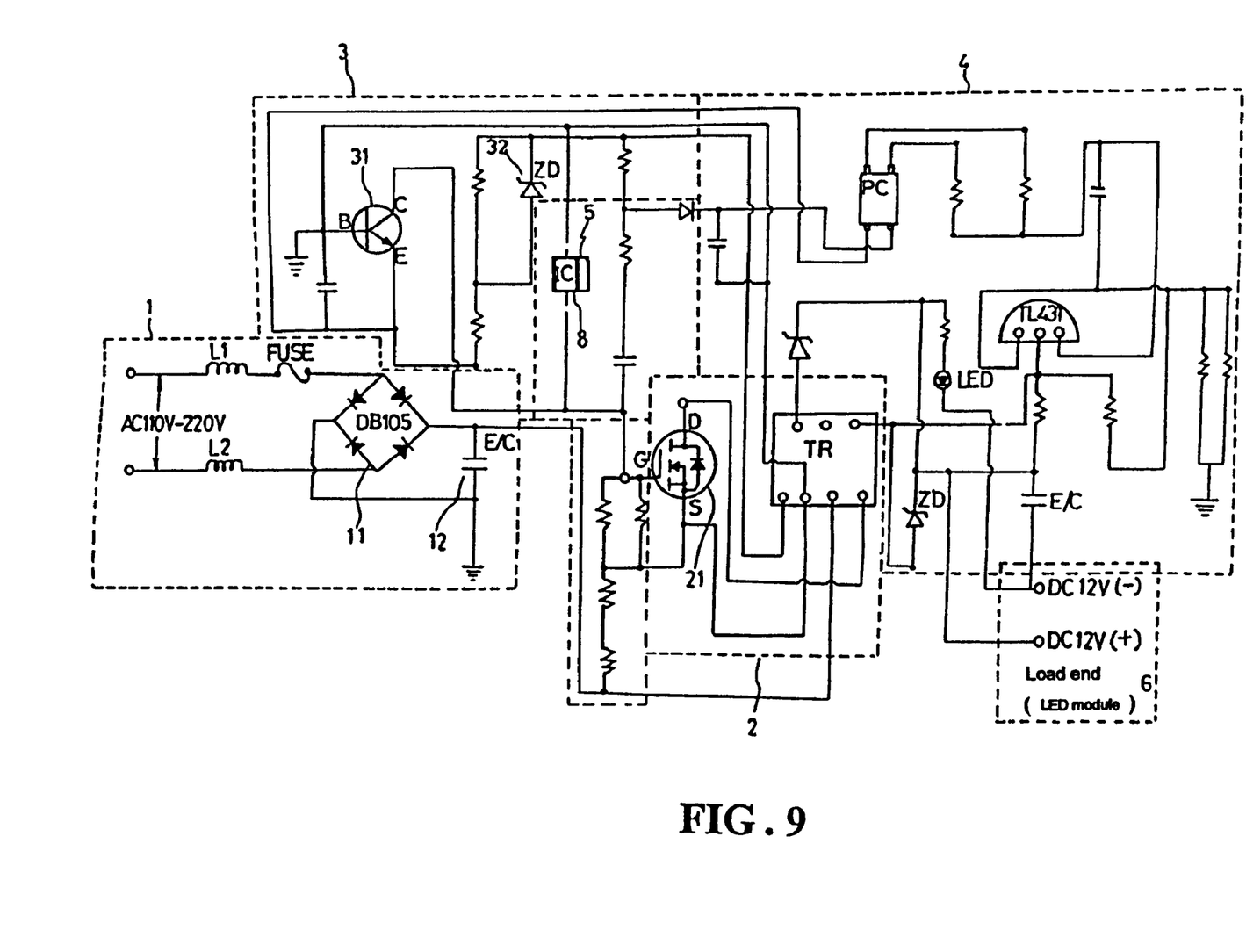
FIG. 9 is a circuit diagram of the power supply device of the present invention.

Also referring to FIG. 9, when the electronic power supply device receives an input voltage of 110-200V, the input voltage is first applied to the rectifier circuit 1 and is subjected to rectification performed by a bridge rectification circuit 11 whereby the input power is converted by diodes that are comprised of the bridge rectification circuit 11 into electricity flowing in a single direction so that the input AC power is rectified to have the positive cycles of the Sine wave of the AC power converted into DC pulses, which are then processed and converted by a filter capacitor 12 into DC voltage. The DC voltage so obtained is still of a high voltage level, which in an example is around 150V, and thus the high DC voltage is subjected to voltage reduction by resistors and applied through a transistor-based feedback type voltage regulation circuit by means of a field effect transistor 21 through a transformer 22, together with a transistor 31 and a Zener diode 32, to realize energy conversion and enhanced transformation efficiency. The LED module is formed as a circuit that is composed of series-connected LEDs and/or parallel-connected LEDs and/or combinations of series-connected LEDs and parallel-connected LEDs.

The pulse power so processed is then used to provide an output power of DC 12V at the load end through the photo-coupling circuit 4, as well as the voltage regulation feature contained therein, so as to apply the output power to the LED module 6 of the load end.

As shown in FIGS. 5 and 9, in the construction of the circuit of the present invention, the field effect transistor (power transistor) 21 is assigned the major role of circuit control, of which the operation principle is that a portion of the output voltage is retrieved and sent to the photo-coupling circuit 4 for error amplification and a reference voltage is provided as a reference for voltage regulation. The error amplification so realized is subjected to amplification by means of voltage variation of a voltage divider with respect to the reference voltage so that the energy conversion system 2 provides a stable voltage output to thereby effect voltage adjustment and automatic voltage regulation.

Figure 4:
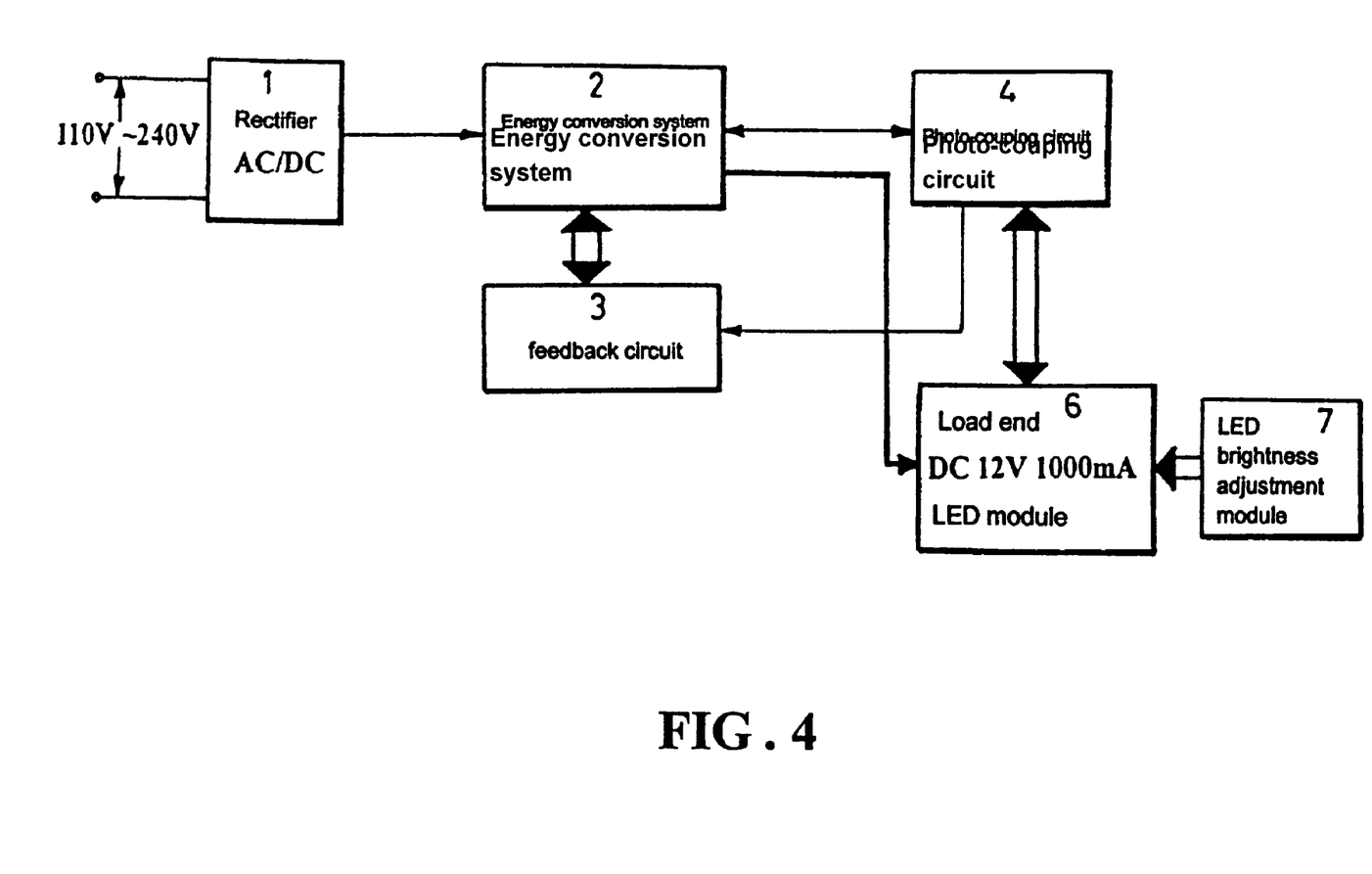
FIG. 4 is a circuit block diagram of a preferred embodiment of a power supply device in accordance with the present invention.
Figure 7:
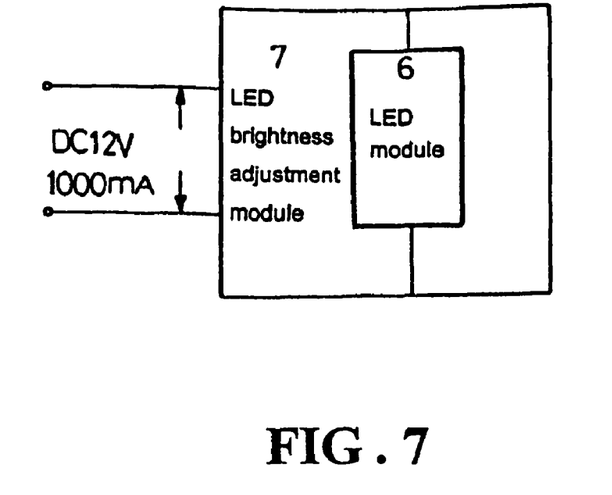
FIG. 7 is circuit block diagram of a light-emitting diode brightness adjustment module in accordance with the present invention.
Figure 8:
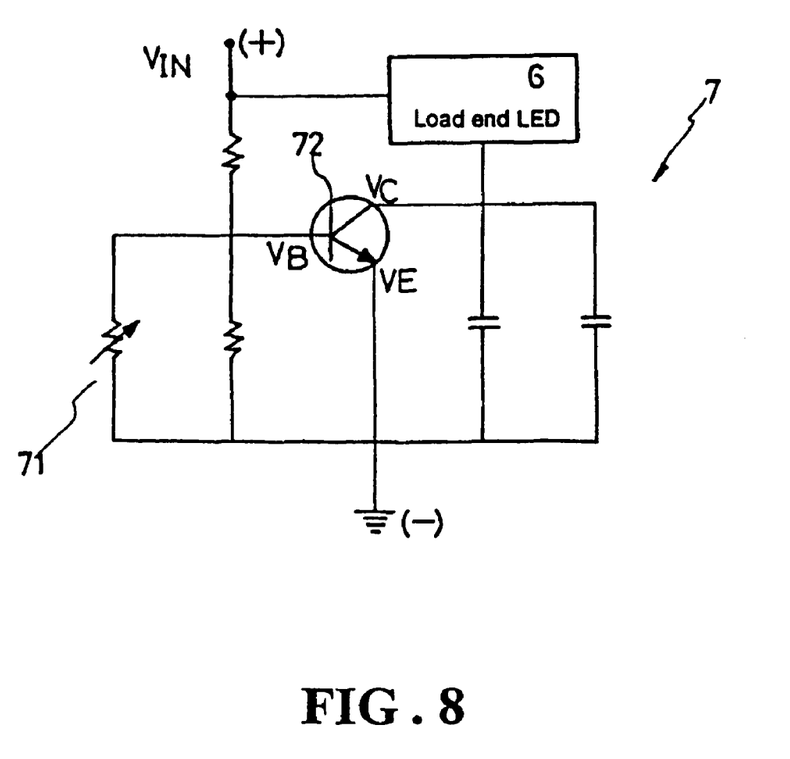
FIG. 8 is a circuit diagram of the light-emitting diode brightness adjustment module in accordance with the present invention.

Further referring to FIGS. 4, 7, and 8, which show a second embodiment of the present invention, on the basis of the previous circuit architecture, to make the brightness of the LED module 6 of the load end adjustable for enhancing the usability and controllability of the LED module 6, the LED module 6 of the load end is integrated with of an LED brightness adjustment module 7 to realize stepless adjustment of brightness. As shown in FIGS. 7 and 8, the LED brightness adjustment module 7 is constructed to employ the adjustment feature provided by voltage division resistors and a variable resistor 71 for controlling voltage applied to a gate of a power transistor 72 to thereby realize adjustment and control of the current through the load circuit of the light-emitting diode and further the instantaneous charging/discharging characteristics of capacitors is used to stabilize the variation of instantaneous current caused in the load end by the brightness adjustment of the variable resistor 71 to realize stable adjustment of brightness. Thus, excellent adjustment of brightness and protection of the variable resistor 71 can be obtained.

Figure 6:
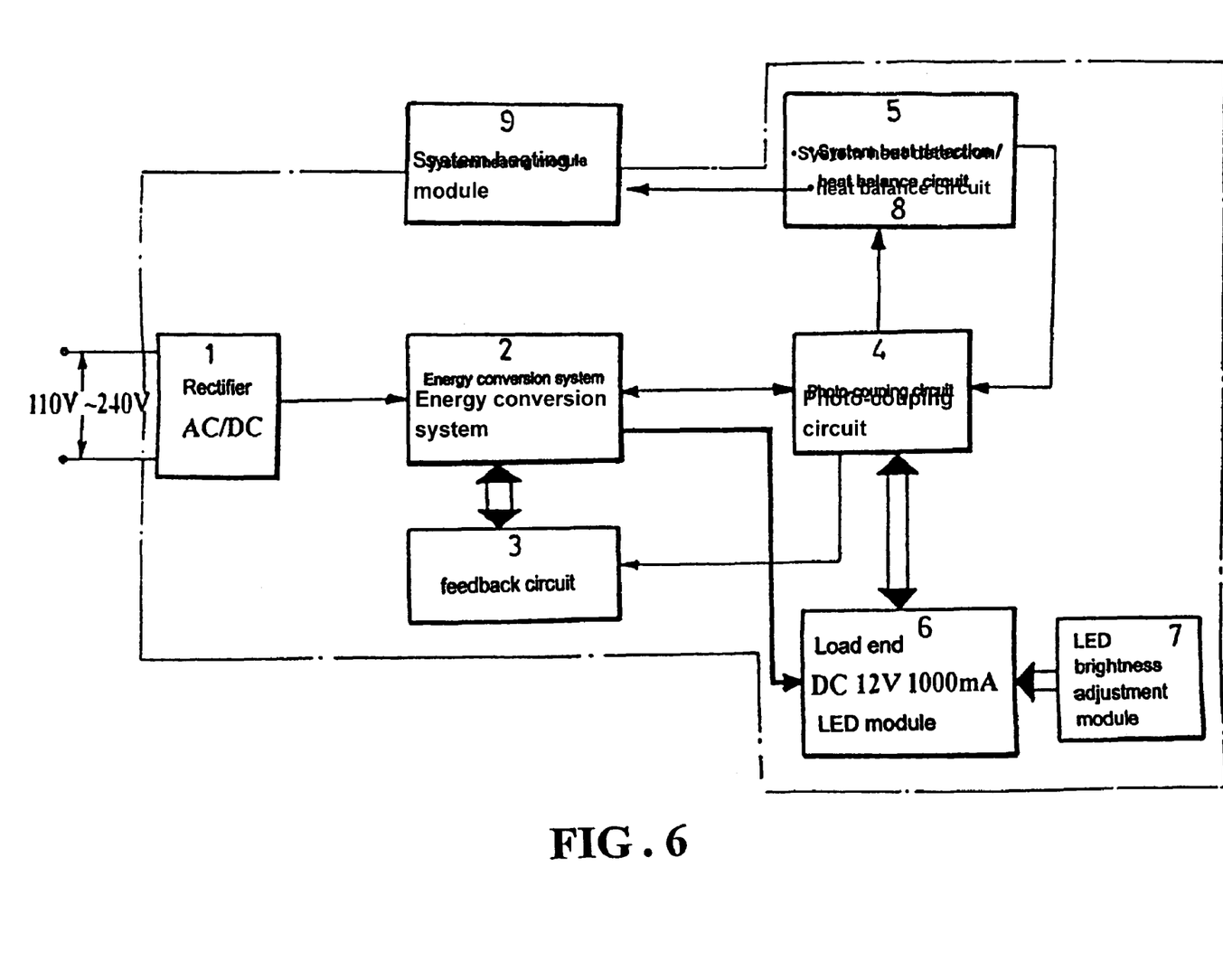
FIG. 6 is a circuit block diagram of a third embodiment of a power supply device in accordance with the present invention.

Based on the previously described architecture, further referring to FIGS. 5 and 6, which illustrate a third embodiment of the present invention, to provide a solution to thermal problems of the circuit and the LED module 6 of the load end, and to provide effective protection, attempts of decreasing and/or increasing current and/or voltage are taken to effectively control the generation of heat. Thus, on the basis of the previously described circuit architecture, a system heat detection circuit 5 and a heat balance circuit 8 and a system heating module 9 are further provided. The system heat detection circuit 5 serves to overcome the problems of abnormal temperature increase of circuit caused by long-term operation, as well as satisfying requirements for outside appearance of products and safety regulation, which leads to unavailability of instantaneous removal of heat, potentially affecting conversion efficiency and life span of the power supply device. Further, the circuit 5 may provide effective detection and protection with respect to the surrounding temperature, whereby once the temperature, including temperature for either the circuit or the surroundings, gets exceedingly high, the system heat detection circuit 5 automatically provides a preset reference to the photo-coupling circuit 4 and the feedback circuit 3 to control the energy conversion system 2 to gradually slow down energy conversion and, depending upon the decrease of the temperature, to re-modify the reference whereby heat balance can be realized to provide the optimum operation environment and operation temperature by following the cyclic operation of detection and protection.

Further, the heat balance circuit 8 serves to detection a lower side limit of temperature and to provide effect control and protection. When the surrounding temperature or the operation temperature gets lowered down to a lower limit of a preset reference, a signal is issued to activate the system heating module 9 to heat the whole circuit system until the temperature increases to an upper limit of the preset reference, at which time the operation of the system heating module 9 is shut down. The system heating module 9 will be re-activated when the lower limit of temperature is once again detected. By this way, the circuit can be maintained in an operation environment within the normal operation temperature.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A power supply device comprising a rectifier, an energy conversion system, a feedback circuit, a photo-coupling circuit, a system heat detection circuit, and a light-emitting diode (LED) module serving as a load end, and characteristic in that:

in the rectifier, a bridge rectification circuit is adapted to convert an alternate current (AC) power into direct current (DC) pulses of positive cycles of Sine-wave, which are subjected to processing by filter capacitor means to become a DC voltage;

in the energy conversion system, filtered wave of the filter capacitor means applies an oscillation signal to the energy conversion system, by which an alternate signal is transformed from a primary side of a transformer to a secondary side to induce a lowered voltage, the alternating pulsed AC power being then converted into DC power by fast diode means;

in the feedback circuit, a portion of an output signal from the energy conversion system is applied to the photo-coupling circuit and the feedback circuit, wherein when variation occurs in the load end, the photo-coupling circuit first detects the variation and amplifies and applies an error signal to the feedback circuit and wherein the feedback circuit bases on a reference voltage to carry out reference voltage correction and applies the corrected signal to the energy conversion system;

in the photo-coupling circuit, a voltage regulation mechanism is included and coupled to the LED module of the load end for amplification and application of the error signal to feedback circuit for reference voltage correction;

in the system heat detection circuit, temperature detection is carried out for effectively providing protection and providing a detection preset reference to the photo-coupling circuit and the feedback circuit to allow the energy conversion system to gradually decrease/increase energy conversion for realizing heat balance that provides optimum operation environment and operation temperature; and the LED module of the load end is coupled to the voltage regulation mechanism of the photo-coupling circuit and the LED module is formed as a circuit that is composed of series-connected LEDs and/or parallel-connected LEDs and/or combinations of series-connected LEDs and parallel-connected LEDs.

2. The power supply device as claimed in claim 1, wherein the LED module of the load end is integrated with an LED brightness adjustment module to realize brightness adjustment feature, which uses adjustment realized by voltage division resistors and a variable resistor to control voltage applied to a gate of a power transistor to further adjust and control of current through load circuit of LEDs and further uses instantaneous charging/discharging characteristics of capacitors to stabilize variation of instantaneous current caused in the load end by brightness adjustment of the variable resistor to realize stable adjustment of brightness and thus obtaining excellent adjustment of brightness and protection of the variable resistor.

3. The power supply device as claimed in claim 1, wherein the photo-coupling circuit is provided with a heat balance circuit and a system heating circuit, wherein the heat balance circuit serves to detect a lower limit of temperature and to start and/or stop operation of the system heating circuit in accordance with upper and lower limits of a preset reference so as to maintain the power supply device in an operation environment within normal operation temperature.

4. The power supply device as claimed in claim 1, wherein the LED module of the load end is integrated with an LED brightness adjustment module and wherein the photo-coupling circuit is provided with a system heat detection circuit.

5. The power supply device as claimed in claim 1, wherein the LED module of the load end is integrated with an LED brightness adjustment module and wherein the photo-coupling circuit is provided with a system heat detection and heat balance circuit and a system heating module.

* * * * *